Patented May 25, 1948

2,442,089

UNITED STATES PATENT OFFICE 2,442,089

PLASTICIZERS

Eugene Lieber, New York, N. Y., assignor to Standard Oil Development Company, a corporation of Delaware No Drawing. Application August 28, 1943, Serial No. 500,431

2 Claims. (Cl. 260—479)

This invention relates to the manufacture of a new composition of matter and, more particularly, the manufacture of new compositions that are especially adapted for use as plasticizers.

A plasticizer may be defined as a non-volatile, non-separating neutral substance which when added to another material imparts plasticity to the mixture. Plasticizers of the solvent type having a very low volatility cause the plasticized film to flow and give without rupture under stress. It allows for film elongation and contraction with changes in temperature and permits bending and yielding without fracture under impact. I. Mellan, in his book entitled "Industrial Solvents" published by Reinhold Publishing Company, in chapter 16, summarized the requirements of a good plasticizer as follows:

1. Good solubility for the material it is used to plasticize, as cellulose derivatives, gums, resins and so forth.
2. Little or no inflammability.
3. Clear, colorless or nearly so. If it contains color, it should not interfere with the finished product.
4. Odorless and tasteless or nearly so, especially when it is used for wrapping food products.
5. Should be unaffected by light, water, chemicals, oils and fats.
6. Stable to atmospheric conditions.
7. Must not crystallize or separate. It must stay in solution permanently.
8. Should possess a high melting point and be non-volatile.
9. Neutral or nearly so.
10. Relatively inexpensive.
11. Must not impair hardness of film, nor plastic mass, nor have bubbling qualities.
12. Should not increase viscosity; if anything, it should decrease it.
13. Should impart ductility, tenacity and adherence.
14. Non-conductor.
15. Compatible with filler, dye, pigments and resins.
16. Must produce highly elastic, non-shrinking and non-scratchable surface.
17. Must produce a homogeneous, tough, flexible and permanent film and should not appreciably reduce film strength.
18. Should be non-injurious to film or plastic mass.
19. Non-hydrolyzing.
20. Resistant to heat, or be heat-proof.
21. Flexibility at all temperatures.
22. High retentivity.
23. Stability on aging.

It has been found impossible and unnecessary for any substance to meet all the above requirements, but as the purpose and use to which the plasticized material will be subjected determines the properties that are necessary in the finished material, different plasticizers or mixtures of different plasticizers are used.

This invention has for its object the preparation of new plasticizers from petroleum hydrocarbons.

According to the present invention substances of the general formula $$(R^1)_n-R^2-(OR^3)_m$$

are effective plasticizers $R^1$ = an alkyl radical derived from petroleum hydrocarbons
$R^2$ = an aryl nucleus
$O$ = oxygen
$R^3$ = an acyl radical
$m, n$ = integers whose value may be one or more.

Typical examples of this class of substances are the following:

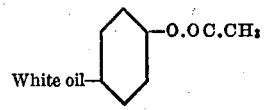

"White oil-phenol-acetate"

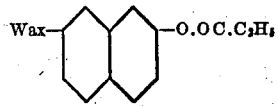

"Wax-naphthol-propionate"

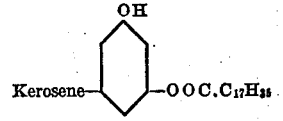

"Keryl-resorcinol-mono-stearate"

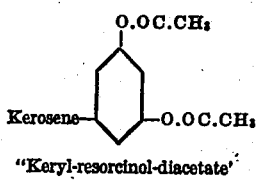

"Keryl-resorcinol-diacetate"

Products of the type of

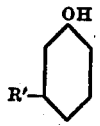

where $R^1$ is an alkyl radical derived from petroleum sources are prepared in a variety of ways well known to the art of organic chemistry and form no part of the present invention. A very convenient procedure comprises the reaction of a chlorinated hydrocarbon with a phenol in the presence of anhydrous zinc chloride as catalysts. The following example will illustrate the method:

EXAMPLE

A kerosene was chlorinated to 16% chlorine content by passing chlorine gas through kerosene at a temperature of 200° F. One hundred sixty-nine grams of ZnCl₂ was finely powdered and mixed with 600 grams of the chloro-kerosene contained in a 2-liter-3-necked Pyrex round bottom flask fitted with a mechanical stirrer, thermometer, and reflux condenser. The stirrer was started and 600 grams of molten phenol added. The reaction

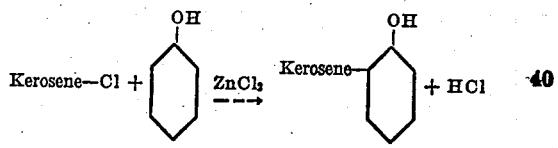

takes place readily, a vigorous evolution of HCl taking place at 120° F. The reaction mixture was heated following the schedule set forth below:

| Time | Elapsed Time | Temp., ° F. |
|---|---|---|
| 10:15 | | 125 |
| 10:50 | 35 min | 205 |
| 11:15 | 1 hr | 280 |
| 11:50 | 1 hr. 35 min | 340 |
| 12:15 | 2 hrs | 343 |
| 1:15 | 3 hrs | ¹ 347 |

¹ Cut heat.

The reaction mixture was allowed to cool and 500 cc. of 20% aqueous HCl was added. The mixture was poured into a separatory funnel and washed twice with hot 20% aqueous HCl followed by four washes with hot water. It was then distilled with fire and steam as follows:

Fraction I=steam in at 220° F. to 360° F.
Fraction II=360° F. to 450° F.
Fraction III=450° F. to 650° F.
Residue=black resinous material=26 grams.

Fractions I and II were combined and consisted of unreacted kerosene and phenol. After separating from the steam condensate this weighed 181 grams.

Fraction III comprised the "keryl-phenol" cut

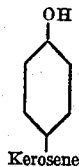

The entire fraction was dissolved in benzol, separated from the steam condensate, and the benzol extract distilled to remove the benzol, the objective being to dry the "keryl-phenol." The last traces of benzol were taken off under high vacuum. The dried "keryl-phenol" fraction weighed 423 grams. This was found to have an "acetyl value" of 160 which means that the product has the composition

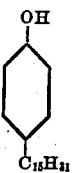

Proceeding in the same fashion as described in Example 1, other alkylated phenols were made by using such petroleum fractions as gas oil, various white oils of low and high viscosity, paraffin wax, sweater oil, refrigerator oil and a lubricating oil. The experimental data for the preparation of these alkylated phenols are summarized in the attached Table I, while Table II summarizes the acetyl values found for these materials. The acetyl values are expressed as milligrams of potassium hydroxide required to saponify one gram of acetylated material.

TABLE I

Alkylated phenols—summary of preparations

| Test No. | Alkylating Agent | | Gms. Phenol | Gms. ZnCl₂ | Reaction | | Gms. Yield |
|---|---|---|---|---|---|---|---|
| | Petroleum Hydrocarbon | Per Cent Cl Content / Grams Used | | | Temp., ° F. | Time, Hrs. | |
| 1 | Kerosene | 16 / 600 | 600 | 169 | 340 | 3 | 423 |
| 2 | Gas Oil | 16 / 800 | 900 | 200 | 350 | 3 | 536 |
| 3 | Bayol-D¹ | 17 / 800 | 900 | 200 | 350 | 1¼ | 609 |
| 4 | Paraffin Wax² | 16 / 800 | 900 | 200 | 350 | 1¼ | 614 |
| 5 | 40 Vis. White Oil | 16 / 800 | 900 | 200 | 350 | 2 | 546 |
| 6 | Refrigerator Oil | 16 / 800 | 900 | 200 | 350 | 1¼ | 505 |
| 7 | Sweater Oil | 16 / 800 | 900 | 200 | 350 | 1¼ | 605 |
| 8 | Lubricating Oil³ | 16 / 800 | 925 | 200 | 245 | 1¾ | 813 |

¹ Bayol-D is a light white oil, B. P. 400–500° F. and 31.8 Saybolt viscosity at 100° F.
² Melting point is 114° F.
³ A neutral having a viscosity of 44 seconds Saybolt at 210° F.

Table II

*Alkylated phenols—summary of acetyl values*

| Test No. | Alkylating Agent | Exp. Value Acetyl Number | Molecular weight | R= |
|---|---|---|---|---|
| 1 | Kerosene | 160.0 | 297 | $C_{15}$ |
| 2 | Gas Oil | 180.8 | 268 | $C_{12}$ |
| 3 | Bayol-D | 165.3 | 297 | $C_{15}$ |
| 4 | Paraffin Wax (114° M. P.) | 139.7 | 359 | $C_{19}$ |
| 5 | 40 Vis. White Oil | 141.6 | 353 | $C_{19}$ |
| 6 | #84-R Refrigerator Oil | 118.2 | 431 | $C_{24}$ |
| 7 | Sweater Oil | 110.9 | 463 | $C_{26}$ |
| 8 | Lubricating Oil | 106.7 | 484 | $C_{28}$ |

A similar experiment was run with the same chloro-kerosene and resorcinol and a high yield of "keryl-resorcinol"

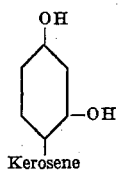

was obtained.

The "keryl-phenols" so obtained are readily esterified. Thus, by treating "keryl-resorcinol" with acetyl chloride a quantitative yield of "keryl-resorcinol-diacetate"

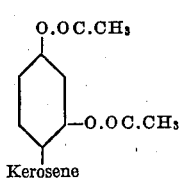

was obtained. Since the "kerosene" radical in the above compound averages 15 carbon atoms, the following comparison between butyl acetyl ricinoleate and keryl-resorcinol-diacetate can be made:

The "keryl-resorcinol-diacetate" so produced is an excellent plasticizer for cellulose products and other materials.

Alternatively,

| | | |
|---|---|---|
| Diamyl phenol | lbs | 234 |
| Glacial acetic acid (5% excess) | lbs | 63 |
| Sulfuric acid | lbs | 2 |
| Benzol | gals | 70 |
| Soda ash | lbs | 5 | are used.

The diamyl phenol, acetic acid and benzol are placed in the esterification reactor, followed by the sulfuric acid. Reaction is effected by heating to reflux. The water of esterification is removed as an azeotrope and is drawn off in the separator, while the benzol is returned to the reactor. One-pound mole of water (2.16 gals.) per pound-mole of diamyl phenol used is recovered when esterifying. There will be a slight excess of water over the theoretical, due to water being contained in the reagents. The reaction is complete when water no longer separates from the benzol on condensation. The reaction mixture is then neutralized with the soda-ash (aqueous solution) and, after washing, the benzol is removed by distillation. This operation also dries the crude product. The benzol recovered is recycled.

The crude product is purified by subjecting to a vacuum distillation at 5–10 mm. absolute Hg pressure, which yields the following:

Fraction I (forerun) = up to 140° C. = 10 lbs.
Fraction II (product) = 140 to 160° C. = 250 lbs.
Residue = 16 lbs.

The yield is 90% of theory based on the diamyl phenol used.

The properties of synthetic plasticizers as obtained are as follows:

| | |
|---|---|
| Saponification number | 179.6 |
| Free organic acidity | 0.06 |
| Refractive index at 25° C | 1.5001 |
| Color | INPA or better |
| Specific gravity at 25/15° C | 0.951 |
| Ash | None |
| Saybolt vis. at 100° F | 174 |
| Solubility in ethyl alcohol | Soluble at 25° C. |
| Solubility in Glac. acetic acid | Soluble at 25° C. |
| Solubility in ASTM naphtha | Soluble at 25° C. |

The attached Table III illustrates the properties of various plasticizers prepared according to this method:

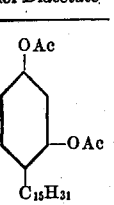

| | Butyl-Acetyl-Ricinoleate | Keryl-Resorcinol-Diacetate |
|---|---|---|
| Structural Formulae [1] | $C_6H_{13}.CH.CH_2.CH:CH.C_7H_{14}.COOC_4H_9$ <br> $\quad\quad\;\; \vert$ <br> $\quad\quad\; OAc$ | (OAc, OAc, $C_{15}H_{31}$ on ring) |
| Empirical Formula | $C_{24}H_{46}O_4$ | $C_{25}H_{40}O_4$ |
| Molecular Weight | 397 | 404 |
| Acyl Groups | 2 | 2 |
| Saponification Value | 282 | 251 |

[1] $Ac = CH_3CO—$.

TABLE III

| Plasticizer | A | B | C |
|---|---|---|---|
| Saponification Value | 151.2 | 96.3 | 128. |
| Free Acidity as Oleic Acid | 0.07% | 0.96% | None. |
| A. S. T. M. Solid Point | −50° F | −50° F | −45° F. |
| Specific Gravity at 25/15° C | 0.984 | 0.872 | 0.952. |
| Viscosity at 100° F. (Saybolt) | 104.2 | 59 | 166.4. |
| N. P. A. Color | 5 | 1½ | 2¼. |
| Boiling Range (10-15 mm.) ° C | 100-300 | 100-250 | 150-275. |
| Ash | None | None | None. |
| Refractive Index at 25° C | 1.5123 | 1.4830 | 1.5013. |
| Solubilities at 25° C.: | | | |
| 95% Ethyl Alcohol | Soluble | Soluble | Soluble. |
| Glacial Acetic Acid | do | do | Do. |
| A. S. T. M. Naphtha | do | do | Do. |
| Chemical Designation | Kero-Phenyl-Acetate | Bayol-D-Phenyl-Acetate (Low Vis.). | Bayol-D-Phenyl-Acetate (High Vis.). |
| Structure | Kerosene—⬡—OAc¹ | Bayol-D—⬡—OAc | Bayol-D—⬡—OAc |

| Plasticizer | D | E | F |
|---|---|---|---|
| Sponification Value | 40.5 | 179.6 | 177. |
| Free Acidity as Oleic Acid | 0.01% | 0.03% | 0.03%. |
| A. S. T. M. Solid Point | 0° F | −5° F | −5° F. |
| Specific Gravity at 25/15° C | 0.881 | 0.951 | 1.022. |
| Viscosity at 100° F. (Saybolt) | 85.9 | 174 | 453.7. |
| N. P. A. Color | 3 | <1 | 1½. |
| Boiling Range (10-15 mm.) ° C | 175-290 | 140-160 | 175-195. |
| Ash | None | None | None. |
| Refractive Index at 25° C | 1.4850 | 1.5001 | 1.5454. |
| Solubilities at 25° C.: | | | |
| 95% Ethyl Alcohol | Insoluble | Soluble | Soluble. |
| Glacial Acetic Acid | do | do | Do. |
| A. S. T. M. Naphtha | Soluble | do | Do. |
| Chemical Designation | Bayol-F-Phenyl-Acetate | Diamyl-Phenyl-Acetate | Diamyl-Phenyl Benzoate. |
| Structure | ²Bayol-F—⬡—OAc | $C_5H_{11}$—⬡—$C_5H_{11}$ with OAc | $C_5H_{11}$—⬡—$C_5H_{11}$ with $O_2C$—⬡ |

¹ Ac=acetyl radicle=$CH_3CO$—
² Bayol-F is a light white oil, B. P.=570 to 690° F. having a Saybolt viscosity of 52 at 100° F.

The plasticizing properties of

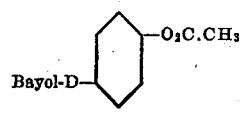

"Bayol-D-phenyl-acetate"

and

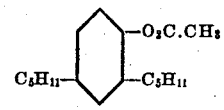

"Diamyl-phenyl-acetate"

were tested in comparison with an authentic sample of Baker's #P-6 "Butyl acetyl ricinoleate."

When incorporated up to 30% by weight in a cellulose acetate film, all three materials produced no color change on the cast film upon exposure to sunlight. The odors of the cast films are satisfactory in all cases. Baker's #P-6 "butyl acetyl ricinoleate" produced a definite haze at and upon 5% concentration, while "Bayol-D-phenyl-acetate" produced only a very faint haze at and above 5% concentration, while "diamyl-phenyl-acetate" produced no haze up to 20%.

The percent compatibility with cellulose acetate was determined by a modified "dilution ratio test" which is carried out as follows:

To 2 grams of cellulose acetate is added 20 cc. of acetone and 2 cc. of the plasticizer in question. A blank is also made using 2 cc. of acetone in place of the plasticizer. The solutions are then titrated with toluene to the point at which precipitation occurs. The number of cc. of toluene added is an indication of the compatibility of the plasticizer with cellulose acetate. The dilution ratio is expressed as: cc. toluene used/cc. solvent (acetone). The following results were obtained:

| Material | cc. Toluene Used | Dilution Ratio | Per Cent Compatibility |
|---|---|---|---|
| Blank | 17 | .85 | 100 |
| Diamyl-phenyl-acetate | 12 | .60 | 70.6 |
| Bayol-D-phenyl-acetate | 11 | .55 | 64.7 |
| Butyl-acetyl ricinoleate | 8 | .40 | 47.1 |

It will be noted that "butyl-acetyl-ricinoleate" has the smallest compatibility.

The cellulose acetate used in the above tests is Hercules grade #LL-1. Solutions for the "film tests" described above were made in the following:

Per cent by volume
Acetone _____ 24
Methyl ethyl ketone _____ 55
Methyl cellosolve acetate _____ 10
Ethyl lactate _____ 11 so as to contain 10% solids. To this were added various concentrations of plasticizer.

I claim:

1. Process of preparing a composition which comprises chlorinating a kerosene until it has a 16% chlorine content in forming chloro-kerosene, refluxing the chloro-kerosene with phenol in the presence of a condensation catalyst, cooling the resulting condensation product mixture and washing with aqueous hydrochloric acid, and distilling the mixture to obtain a fraction boiling between 450° and 650° F., and subsequently esterifying said distillation fraction of the mixture with an organic carboxylic acid.

2. Process according to claim 1 in which zinc chloride is used as condensation catalyst.

EUGENE LIEBER.

REFERENCES CITED

The following references are of record in the file of this patent:

UNITED STATES PATENTS

| Number | Name | Date |
|---|---|---|
| 970,662 | Sulzberger | Sept. 20, 1910 |
| 1,033,841 | Sulzberger | July 30, 1912 |
| 1,813,607 | Bollmann | July 7, 1931 |
| 2,073,316 | Niederl | Mar. 9, 1937 |
| 2,134,547 | Buc | Oct. 25, 1938 |
| 2,138,809 | Reiff et al. | Nov. 29, 1938 |
| 2,239,533 | Mikeska | Apr. 22, 1941 |
| 2,273,100 | Gleason | Feb. 17, 1942 |
| 2,287,940 | Smith | June 30, 1942 |
| 2,337,924 | Platz et al. | Dec. 28, 1943 |